United States Patent
Lecce

[15] 3,698,361
[45] Oct. 17, 1972

[54] APPARATUS FOR FEEDING AND MAINTAINING NEONATAL PIGLETS

[72] Inventor: James G. Lecce, 2729 Cambridge Road, Raleigh, N.C. 27608

[22] Filed: March 22, 1971

[21] Appl. No.: 126,751

[52] U.S. Cl. ............... 119/51.11, 119/18, 119/52 B, 222/70
[51] Int. Cl. ........................... A01k 5/02, A01k 7/02
[58] Field of Search ....... 119/51.11, 52 B, 18, 17, 51, 119/52, 56; 222/70

[56] References Cited

UNITED STATES PATENTS

| | | | |
|---|---|---|---|
| 2,620,770 | 12/1952 | Drake | 119/18 |
| 2,661,800 | 12/1953 | Reichenbach | 119/18 X |
| 2,987,038 | 6/1961 | Cole | 119/18 |
| 3,087,461 | 4/1963 | Strand | 119/52 B |
| 3,303,823 | 2/1967 | Cohen | 119/51.11 |
| 3,382,847 | 5/1968 | Clark | 119/51.11 |

Primary Examiner—Aldrich F. Medbery
Attorney—A. Yates Dowell and A. Yates Dowell, Jr.

[57] ABSTRACT

Apparatus for feeding and maintaining newborn animals to increase the rate of survival as well as to increase the growth potential of the animals. The apparatus includes a plurality of individual cages or containers with one cage being provided for each animal, means for feeding each animal at specific time intervals with precise amounts of food based on the characteristics of the individual animals, and means for automatically cleaning the food receptacles at the termination of the feeding period to maintain the receptacles in an aseptic condition.

10 Claims, 12 Drawing Figures

PATENTED OCT 17 1972

3,698,361

INVENTOR
JAMES G. LECCE

BY
ATTORNEYS

INVENTOR
JAMES G. LECCE

BY *[signature]*

ATTORNEYS

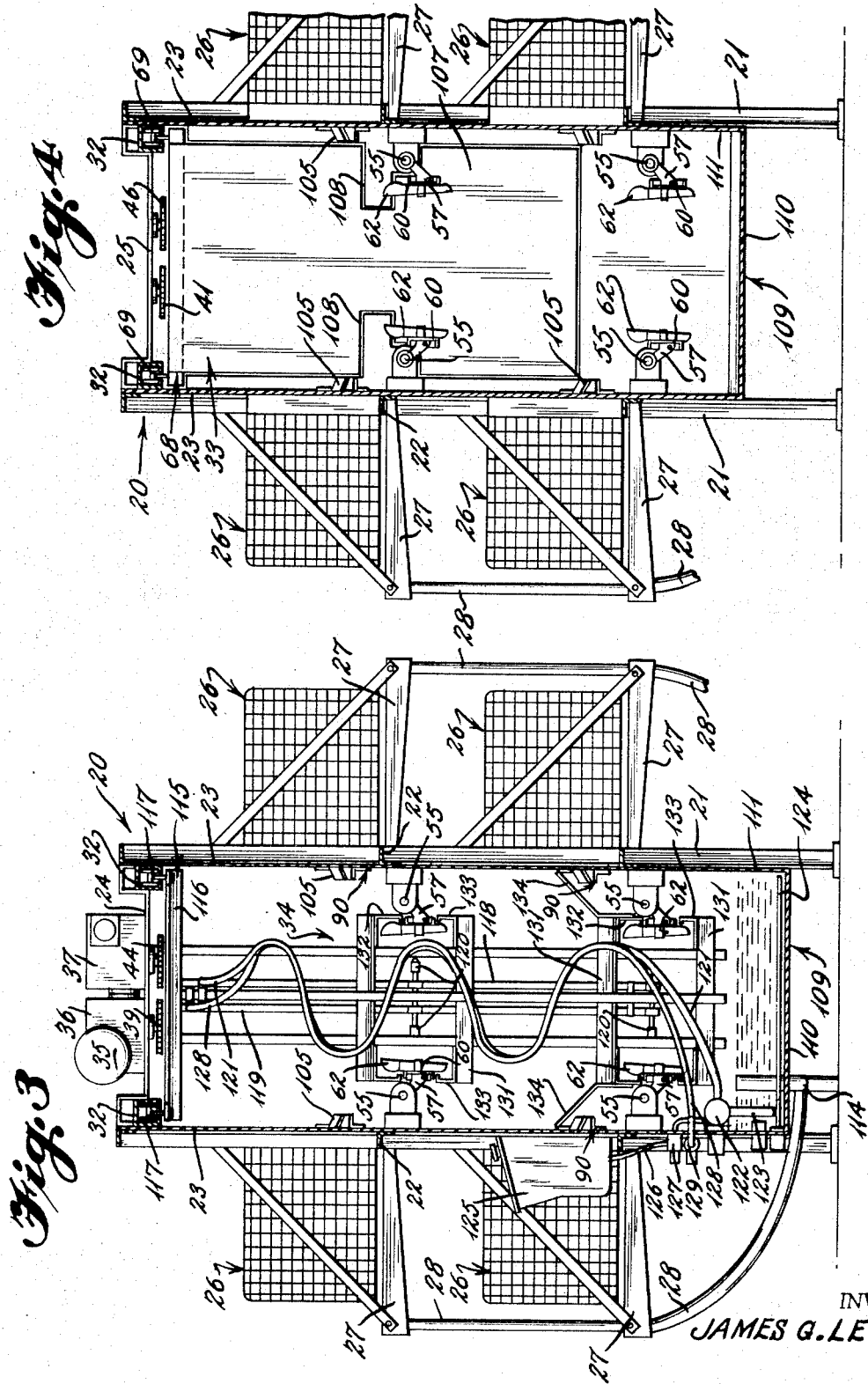

INVENTOR
JAMES G. LECCE

BY
ATTORNEYS

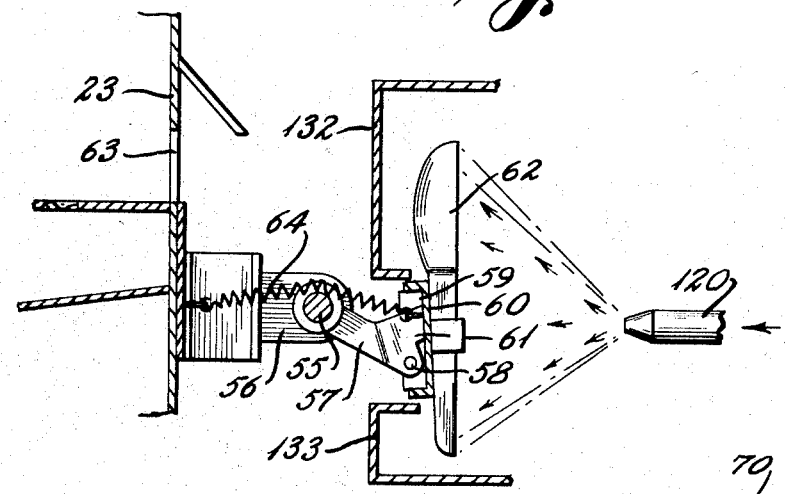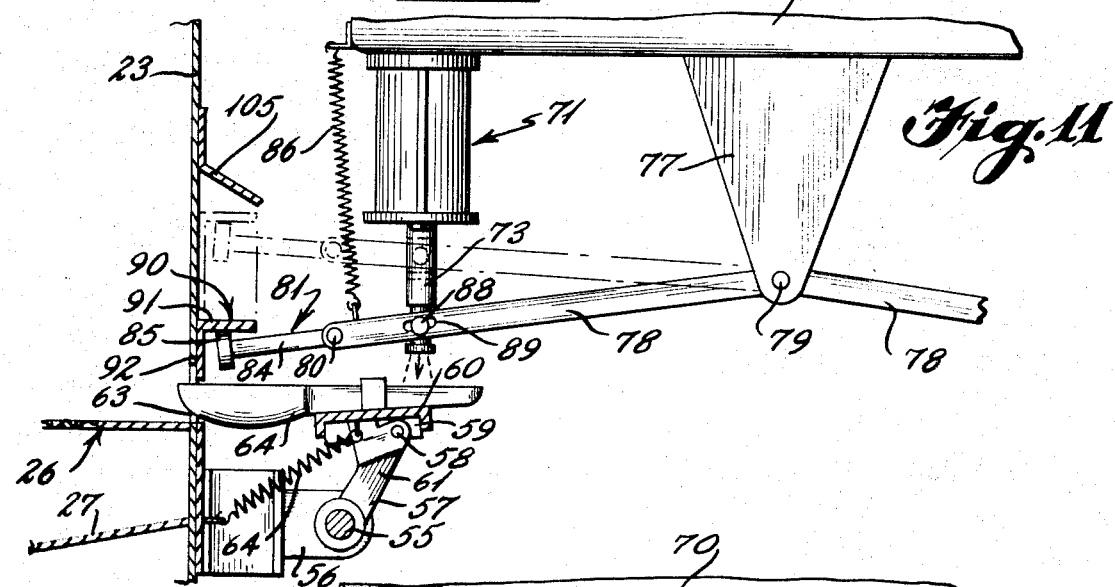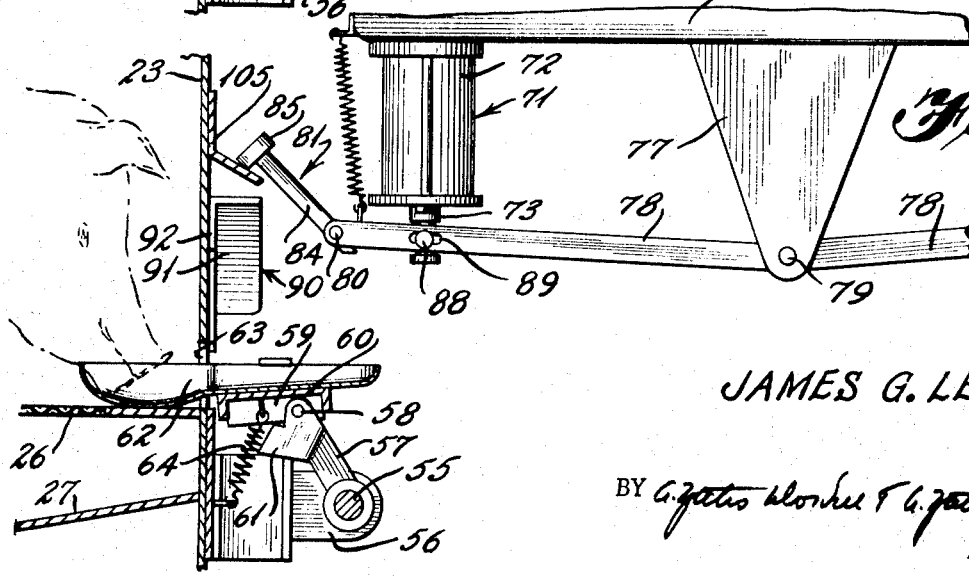

APPARATUS FOR FEEDING AND MAINTAINING NEONATAL PIGLETS

BACKGROUND OF THE INVENTION

1. Field of the Invention

This invention relates generally to the care and feeding of animals of various kinds and relates particularly to the feeding and maintaining of piglets from a few moments after birth until the animal is several weeks old.

2. Description of the Prior Art

The raising of animals from birth has always been a difficult task and this has been particularly true of piglets. Most animals at birth are well developed and acquire passive immunity from the first milk (colostrum) and after a short period of approximately twelve hours, the fluid dispensed by the dam changes to vitamin enriched milk which is nutritionally correct for the young. Several weeks later the young animal is weaned to dry feed which may or may not contain additives that encourage growth.

With most animals the milk of the dam can be replaced by a formula shortly after birth without ill effect on the infant. However, the care and feeding of infant piglets has not followed the conventional pattern. The mortality rate of infant piglets has been extremely high, both for piglets which have been suckled by the sow and piglets which have been artificially fed. After many years of experimentation to determine the reasons for the difficulty in raising baby pigs, it has been found that piglets, unlike other animals including humans, are born before they are fully developed, and that the sow through specialized nutrients and conditions has the capacity to rapidly complete development after birth. Specifically it has been found that piglets are immature with regard to: 1. serum protein profile; 2. intestinal epithelium; 3. isoenzyme; and 4. digestive capacity.

Even though a sow may produce from fifteen to 22 piglets per litter, the sow has only 10 to 12 teats and therefore it is unlikely that more than 10 piglets will survive. Also due to the difference in sizes of the piglets, the larger, stronger piglets avail themselves of the best teats, while the weaker runts are relegated to the least productive teats and therefore suffer from malnutrition and become weak, stunted and vulnerable to disease. Many of the piglets are suffocated or are crushed by the sow lying on the piglets.

Statistics show that in this type of animal husbandry approximately 7.5 pigs per litter and two litters per year reach the marketable stage. This means that the average sow has been able to produce approximately 15 pigs per year, especially since the sow cannot be rebred during the normal 6 week period that she is nursing her piglets after each litter. Theoretically, if the sow were free from the need to nurse her piglets, she could be bred three times per year and would produce from 10 to 15 piglets per litter so that the production of pigs per sow per year could be raised from 15 to approximately 30 to 45 marketable pigs.

Some efforts have been made to provide apparatus for feeding and maintaining neonatal piglets; however, these prior art devices have not been entirely satisfactory since it is important that the piglets be confined within individual cages and that the piglets be fed a predetermined amount of food in accordance with the size and weight of the piglet, that the food be dispensed at regular intervals of approximately one hour and not to exceed 1½ hours, that the food containers and feeding trays be maintained in at least a nearly sterile condition, and that the food be maintained and dispensed at a predetermined temperature, and the prior art devices have not provided means for accomplishing these conditions.

SUMMARY OF THE INVENTION

The present invention is an apparatus for feeding and maintaining neonatal piglets and includes a plurality of individual cages or compartments with one cage for each piglet. Each cage has a feeding tray associated therewith and means is provided for automatically dispensing a predetermined quantity of liquid diet or nutritionally correct food to each piglet according to his individual needs and at a predetermined frequency. After the trays containing diet are inserted into the cages so that the piglet will have access thereto for a predetermined period of time, the trays are withdrawn and aseptically treated.

It is an object of the invention to provide an apparatus for feeding and maintaining neonatal piglets and including a plurality of individual cages for piglets, means for offering a predetermined quantity of diet to each piglet at predetermined intervals and for a specific length of time, and means whereby the diet receptacles are removed from the cages and aseptically treated.

BRIEF DESCRIPTION OF THE DRAWINGS

FIG. 2 is an enlarged section on the line 2—2 of FIG. 1.

FIG. 3 is a vertical section on the line 3—3 of FIG. 1.

FIG. 4 is a vertical section on the line 4—4 of FIG. 1.

FIG. 10 is an enlarged detailed section illustrating the food tray in washing position.

FIG. 11 is an enlarged detailed section similar to FIG. 10 illustrating the food tray in position to receive food.

FIG. 12 is an enlarged detailed section similar to FIG. 10 illustrating the food tray after it has been inserted into the cage and the food dispenser unit is being retracted.

DESCRIPTION OF THE PREFERRED EMBODIMENT

Figure 1:
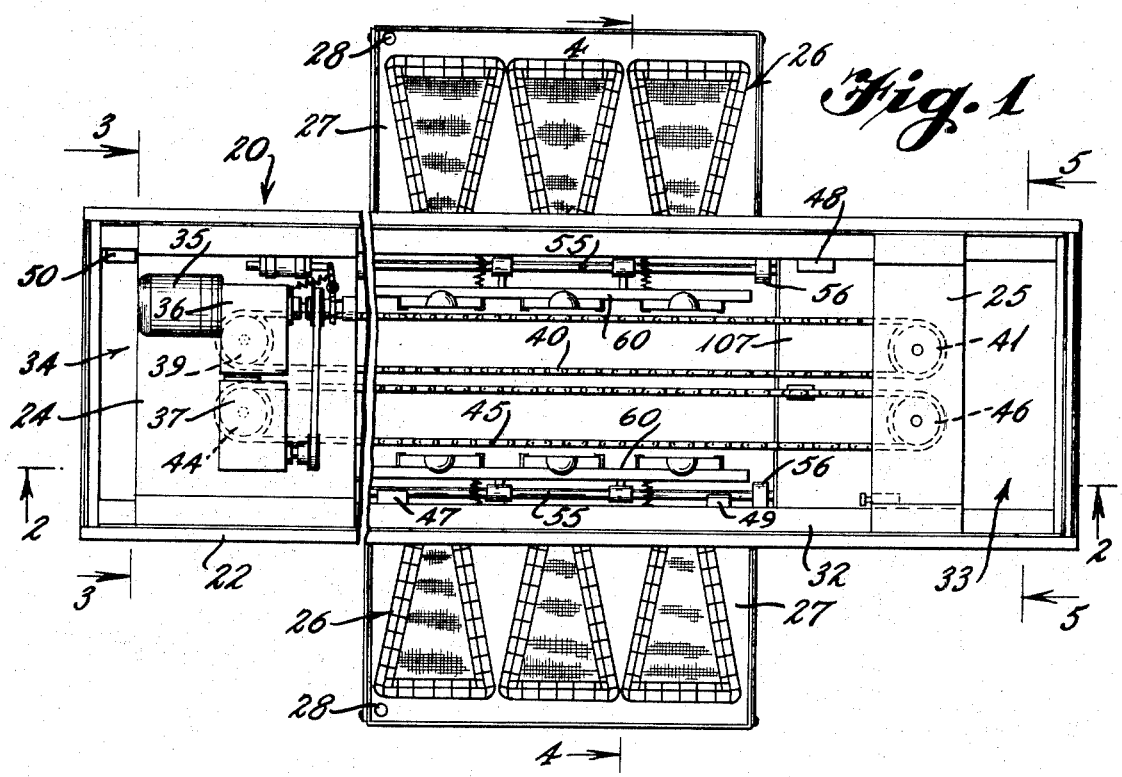
FIG. 1 is a top plan view illustrating one application of the invention.
Figure 6:
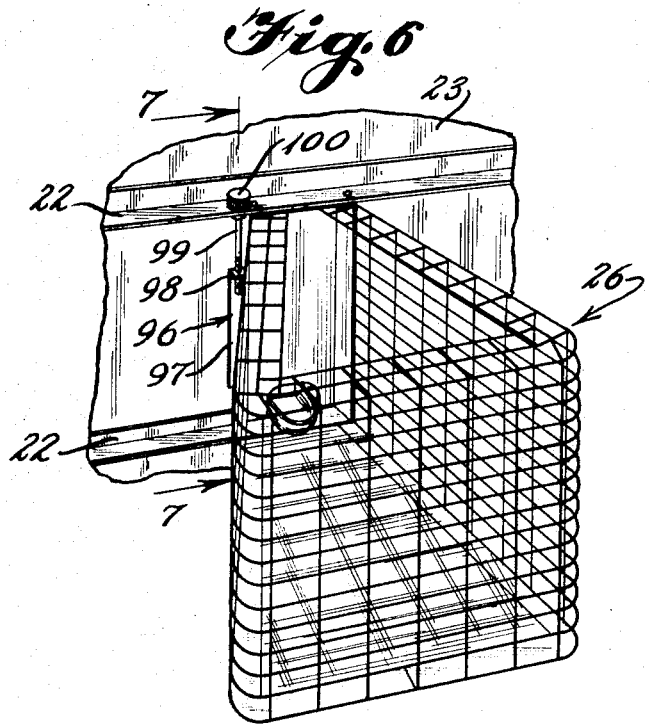
FIG. 6 is an enlarged perspective of one of the cages.

With continued reference to the drawings, a frame 20 is provided having upright posts 21 connected by a plurality of generally horizontal stringers 22. The frame includes a pair of spaced generally parallel vertically disposed side walls 23 mounted on the posts 21 and defining an alleyway. Platforms 24 and 25 connect the upper portions of the side walls 23 at opposite ends of the frame 20.

A plurality of cages or containers for animals 26 are mounted on the side walls 23 exteriorly of the alleyway and such cages preferably are of a size to contain a single piglet. If desired a plurality of cages can be mounted in side-by-side relation in a row and, as illustrated, one row of cages may be disposed above one or more other rows of cages. The cages 26 constructed of any desired material, such as wire or sheet material and may include side walls and at least a bottom wall with the top wall being omitted if desired. A drain pan 27 normally is disposed below each row of cages and such drain pans are provided with a drain pipe 28 connected to a sewer outlet.

A track 32 is located along the upper edge of each of the side walls 23 and such tracks extend substantially the full length of the side walls. At one end of the frame 20 a diet dispensing unit 33 is suspended from the tracks and at the opposite end a sterilizing unit 34 also is suspended from the tracks. The dispensing unit 33 and the sterilizing unit 34 are adapted to be selectively moved through the alleyway between the walls 23, as well as between the cages 26 in which the piglets are confined. In order to do this a reversible power plant 35, which may be an electric motor, internal combustion engine, hydraulic motor, or other source of power, is adapted to drive a first gear reduction 36, or the gear reduction 36 could be declutched so that the power plant 35 will drive a second gear reduction 37 through a drive belt 38.

The gear reduction 36 drives a drive sprocket 39 connected by a chain 40 to a driven sprocket 41 suspended below the platform 25. The gear reduction 37 drives a drive sprocket 44 connected by a chain 45 to a driven sprocket 46 mounted on the platform 25 adjacent to the driven sprocket 41. The diet dispensing unit is connected to the chain 40 so that when the gear reduction 36 is engaged, operation of the power plant in one direction will move the dispensing unit along the tracks until the dispensing unit engages a limit switch 47 and reverses the power plant 35. When the power plant is reversed, the dispensing unit will return to its initial position where it will engage a limit switch 48 and deactivate the power plant 35.

The sterilizing unit 34 is connected to the chain 45 so that operation of the power plant to drive the rear reduction 37 will move the sterilizing unit along the tracks 32 until it passes all of the cages 26 and engages a limit switch 49. The limit switch 49 will reverse the power plant 35 and return the sterilizing unit to its initial position where it will engage a limit switch 50 to deactivate the power plant.

It is important that all of the piglets be fed at specified intervals, normally 1 hour to 1½ hours apart, and that the piglets have access to the food for a period of time of approximately 10 minutes. In order to do this, an elongated rod or shaft 55 is mounted in bearings 56 just below each row of cages on both of the side walls 23. Each of the shafts 55 is provided with at least two arms 57 fixed at one end to the shaft 55 so that rotation of the shaft will cause rotation of the arms. The opposite end of each of the arms is swingably connected by a pin 58 to ears or lugs 59 carried by a tray support member 60. The opposite end of each of the arms is provided with an angular enlargement 61.

A plurality of feeding trays or pans 62 are removably mounted on each of the support members 60 and as illustrated each of such trays is generally T-shaped and has a portion adapted to extend through openings 63 in the side walls 23 so that the piglets within the cages will have access to the contents of the trays. As illustrated in FIGS. 10–12, a spring 64 or other resilient member retains the tray support member 60 against the angular enlargement 61 so that the trays are in a horizontal position and ready to receive food therein when the shafts 55 have moved the trays 62 to a food receiving position. When food has been placed in all of the trays, the shafts 55 are rotated so that at least a portion of each pan will enter the cages 26. After approximately 10 minutes during which time the piglets will consume the food, the shafts 55 are rotated in a reverse direction until the trays 62 are disposed in a generally vertical position for cleaning.

The shafts 55 mounted on the side walls 23 on opposite sides of the alleyway are adapted to be rotated simultaneously and in opposite directions in any desired manner, as by a motor 65 having a gear reduction 66 connected to the shafts by conventional belts, chains or other mechanical connection means. The motor 65 and the power plant 35 normally are actuated at selected intervals by a conventional timing mechanism (not shown) and normally are deactuated by overriding limit switches or the like.

In order to dispense food in liquid form into the individual trays, and in order to dispense an exact amount in accordance with the weight and other requirements of an individual piglet, the dispensing unit 33 includes a carriage 68 supported by rollers 69 from the tracks 32 and such carriage supports a pair of vertically spaced reservoirs 70 which may be refrigerated or supplied with heat as desired. Preferably the liquid food supply is maintained at a temperature which is palatable to the piglets but which retards the growth of bacteria.

Figure 8:
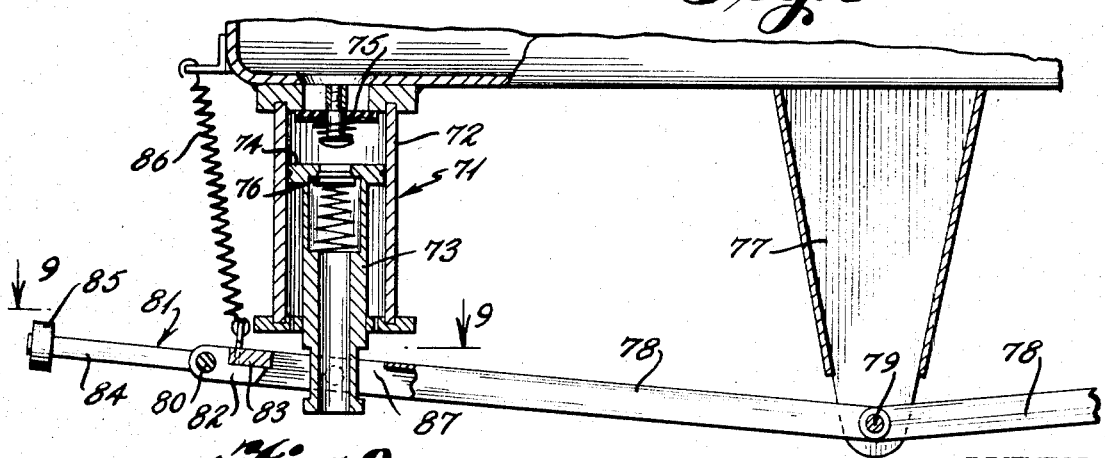
FIG. 8 is an enlarged fragmentary section on the line 8—8 of FIG. 2.
Figure 9:
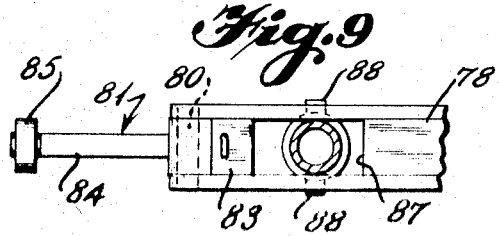
FIG. 9 is a section on the line 9—9 of FIG. 8.

Each of the reservoirs 70 is provided with a pair of spaced metering pumps 71 located at opposite sides thereof. Each of the metering pumps includes a hollow cylindrical chamber 72 having a tubular plunger 73 with a sealing flange 74 extending outwardly into engagement with the inner periphery of the chamber 72 and such plunger is mounted for vertical sliding movement within the chamber 72. As illustrated in FIG. 8, a first spring loaded valve 75 provides communication between the reservoir 70 and the cylindrical chamber 72, and a second spring loaded valve 76 provides communication between the cylindrical chamber 72 and the plunger 73. It is noted that the spring loaded valves 75 and 76 could be replaced by conventional butterfly valves or flapper type valves.

In order to operate the metering pumps 71, a downwardly extending post 77 is mounted on the reservoirs 70 between the metering pumps. A pair of outwardly extending levers 78 are swingably connected by a pin 79 to the post 77 and each of such levers extends outwardly toward the side walls 23. As illustrated in FIGS. 8–12, the outer end of each lever 78 is bifurcated and pivotally connected by a pin 80 to an operating arm Preferably preferably the operating arm includes a reduced portion 82 at one end which normally engages a shoulder 83 on the lever 78. The opposite end of the operating arm includes a shaft 84 on the outer end of which is mounted a roller 85. A spring 86 or other resilient member has one end connected to the reservoir 70 and the opposite end connected to the lever 78 for urging the lever upwardly.

Each of the levers 78 is loosely connected to the plunger 73 of an associated metering pump 71 in any desired manner. As illustrated, the lever 78 has a slot 87 large enough to receive the lower end of the plunger 73 so that the arm will be disposed on opposite sides of such plunger. A pin 88 extends outwardly from each side of the plunger 73 and such pins are rotatably received within slots 89 in the lever 78.

When the outer end of the operating arm is moved downwardly, it causes the plunger 73 to be extended from the bottom of the cylindrical chamber 72. This creates a partial vacuum within the chamber so that liquid food from the reservoir 70 will flow past the valve 75 into the chamber 72. When the downward pressure on the lever is relieved, the valve 75 will close and the spring 86 will return the lever to its raised position. When the lever 78 is being raised, such lever will raise the plunger 74 into the chamber 72. As the plunger is being raised, the liquid food within the cylindrical chamber 72 will force the valve 76 to open so that the liquid food will be discharged through the hollow plunger 73 where it will fall by gravity into the tray 62 directly below the same.

Figure 7:
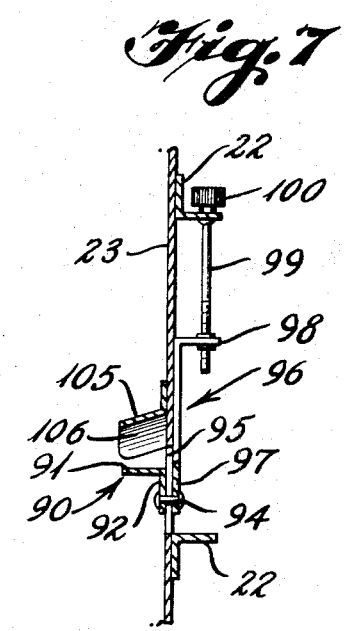
FIG. 7 is an enlarged section on the line 7—7 of FIG. 6.
Figure 5:
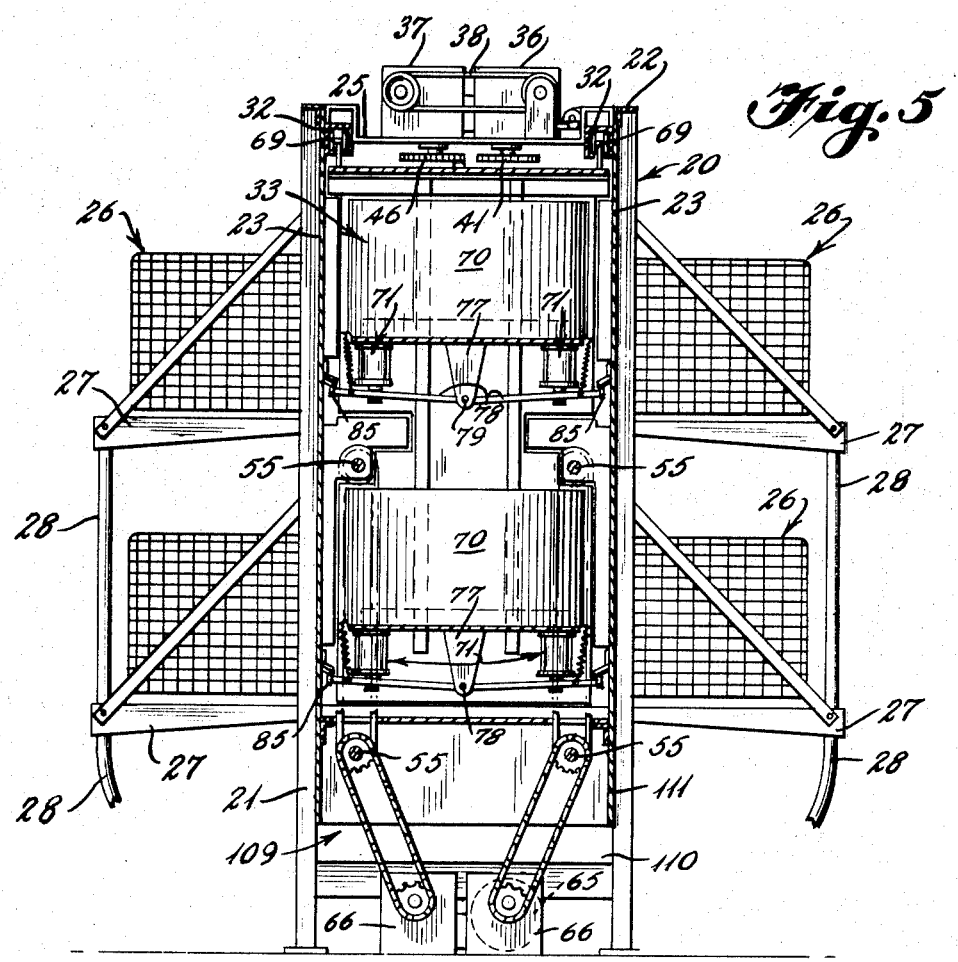
FIG. 5 is a vertical section on the line 5—5 of FIG. 1.

It is apparent that the swinging movement of the lever 78 controls the amount of liquid food dispensed into each tray. Therefore, in order to dispense food in accordance with an individual piglet's requirements, an adjustable means must be provided for controlling the movement of the operating arm. In the present instance, this is done by providing an inclined plane 90 adjacent to each cage and each inclined plane has an outwardly extending flange 91 and a downwardly extending flange 92. The downwardly extending flange is swingably connected at one end by a pivot pin 93 to the side wall 23 and the opposite end of the downwardly extending flange has a rivet or pin 94 extending through an arcuate slot 95 in the side wall 23 and connected to an adjuster 96 (FIG. 7) on the opposite side of such wall. The adjuster 96 includes a movable member 97 to which the rivet 94 is connected and such member is provided with a flange 98 having a threaded opening extending therethrough. An elongated bolt 99 having an enlarged head 100 is rotatably mounted on one of the stringers 22 and is threadedly received within the opening of the flange 98 so that rotation of the bolt 99 will raise and lower the movable member 97 and swing the inclined plane 90 about the pin 93.

The outwardly extending flange 91 is disposed in the path of travel of the roller 85 on the end of the operating arm 81 so that when the dispensing unit 33 is moving in one direction, the roller 85 will engage an inclined plane 90 adjacent to each cage and dispense a required amount of liquid food into each tray depending upon the angularity of the inclined plane. As an example, if a cage is unoccupied, the inclined plane 90 will be moved to a generally horizontal position so that the roller 85 will pass thereunder and no food will be dispensed. If a piglet is relatively large, the plane 90 will be inclined at a relatively steep angle so that a substantial amount of food will be dispensed.

In order to prevent operation of the metering pumps 71 when the dispensing unit 33 is being returned to its initial position, an overriding track 105 is mounted on each of the side walls 23 above the inclined planes 90. Each track has a downwardly extending portion 106 pivotally connected to one end thereof and such portion is adapted to swing upwardly to permit the rollers 85 to pass when the dispensing unit is moving forwardly. When the dispensing unit is being retracted, the rollers 85 will engage the downwardly extending portions 106 and will ride up onto the tracks 105 and cause the operating arm 81 to swing upwardly about the pin 80 so that the roller will bypass the inclined planes 90. Obviously after the rollers 85 have passed the last inclined plane on the return trip, such rollers will roll off of the tracks 105 and will be in a position to dispense liquid food when the dispensing unit again is moved in a forward direction.

The inclined planes have been illustrated and described as being adjusted manually according to the weight of the piglets; however, it is known that the piglets will gain a predetermined amount of weight each day and therefore, it is contemplated that a cam system could be built which would automatically increase the volume of diet each day. Also it is contemplated that the cages could be cantilevered so that the piglet's weight could be sensed and this could automatically set the volume of liquid diet to be fed to the individual piglets.

A partition or wall 107 is mounted on the dispensing unit 33 to protect the reservoirs and dispensing mechanism from heat and moisture when the sterilizing unit 34 is in operation. The wall 107 is provided with cutout portions 108 to permit the dispensing unit to pass the tray support member 60 with the trays 62 thereon when the trays are in a generally horizontal position. After the liquid food has been dispensed into the trays, the shafts 55 are rotated so that at least portions of the trays enter the openings 63 to permit access to the food by the piglets. The trays remain within the cages for approximately 10 minutes after which a timing mechanism activates the motor 68 to retract the trays and rotate the tray support member 60 until the trays are in a substantially vertical position, as illustrated in FIGS. 4 and 10 in which position the trays are adapted to be cleaned and substantially sterilized by the sterilizing unit 34.

The lower portions of the walls 23 are connected by a drain pan 109 having a bottom wall 110, side walls 111 and end walls 112 and 113. As illustrated in FIG. 2, the bottom wall 110 is inclined downwardly from the end wall 112 to the end wall 113 providing a sump for containing a solution of water and cleaning and sterilizing agents. An overflow pipe 114 is located in the lower end of the drain pan 109 and extends upwardly therein to regulate the liquid level within the pan. The lower end of the overflow pipe may be open to discharge liquid into a sewer or may be connected to a discharge pipe (not shown) for discharging liquid in a remote location.

The sterilizing unit 34 includes a carriage 115 having a frame 116 supported by rollers 117 from the tracks 32. A pair of generally vertically disposed headers 118 and 119 are mounted on the frame 116 and each of such headers includes a plurality of outwardly extending generally horizontal crosspipes having nozzles 120 on opposite ends thereof located substantially in alignment with each of the rows of trays 62. The header 118 is connected by a flexible hose 121 to a pump 122 having a pickup or suction pipe 123 extending downwardly into the liquid within the drain pan 109. An electric or other heater 124 is adapted to heat the solution within the drain pan to a desired temperature to clean and sterilize the trays 62.

To assist in the cleaning process, a tank 125 for detergent or other cleaning agent is mounted on one of the side walls 23 and connected by a pipe 126 to the drain pan or sump 109 and if desired a solenoid operated metering valve 127 connected to a detergent sensing device 130, may control the flow of detergent through the pipe 126 to maintain the solution at a predetermined concentration. When the sterilizing unit is being moved during the washing phase, the pump 122 is operated to force the solution of hot water and cleaning agent through the hose 121 and the nozzles 120 of the head 118 to spray onto the trays 62 and remove any matter clinging to the trays. After the sterilizing unit 34 has completed the washing phase, the pump 122 is stopped.

During a second or rinsing phase, the trays are rinsed by clear hot water introduced into the header 119 through a hose 128 connected to an outside source of hot water through a solenoid operated valve 129. The clear rinse water falls by gravity into the drain pan 109 and causes some of the solution therein to flow into the overflow pipe 114. Preferably the sensor 130 is provided for controlling the concentration of detergent or other cleaning agent within the liquid solution contained in the drain pan 109. Since some detergent will overflow into the pipe 114, the sensor 130 will control the metering valve 127 to maintain the solution at a desired concentration.

In order to prevent cleaning solution and rinse water from spraying into the cages 26 through the openings 63, the frame 116 of the sterilizing unit carriage includes a plurality of pairs of cross member 131 with the upper member of each pair having a downwardly extending shield 132 and the lower member of each pair having an upwardly extending shield 133. The shields 132 and 133 are adapted to pass behind the trays 62 and the free ends of such shields terminate in close proximity to the tray support member 60 so that the spray from the nozzles 120 will be confined substantially to the area of the trays. To prevent liquid from the upper nozzles from running down the walls 23 into the lower openings 63 and to prevent the upper nozzles from spraying water directly into such lower openings, the upper cross member of the lower pair of cross members is provided with a pair of opposed upwardly and outwardly extending baffles 134 which extend substantially into engagement with the side walls 23 to protect the lower openings. If desired such baffles may have flexible sealing strips along their outer edges which engage the side walls 23 and slide there-along.

In the operation of the device, the motor 65 will operate in one direction to rotate the shafts 55 substantially 90° so that the trays 62 are generally horizontal. In this position the motor 65 is deactivated and the power plant 35 is energized and operates the gear reduction 36 to cause the diet dispensing unit 33 to move through the alleyway between the side walls 23. During the traverse of the diet dispensing unit the rollers 85 will engage the inclined planes 90 and cause the levers 78 to move the plungers 73 of the metering pumps and dispense a predetermined amount of liquid diet into each of the trays. The inclined planes 90 are adjusted to dispense a desired amount of liquid diet to each piglet in accordance with the size and weight of the individual piglet.

After the liquid diet has been dispensed into all of the trays 62, the motor 65 again is energized in the same direction to cause at least portions of the trays 62 to be inserted through the openings 63 into the individual cages 26 after which the motor again is deactivated. Simultaneously, the power plant 35 is reversed and the diet dispensing unit 33 is returned to its initial position. During the return traverse the rollers 85 roll along the overriding track 105 so that no liquid diet will be dispensed. In this position the piglets have access to the liquid diet which they consume. Approximately 10 minutes later the motor 65 is operated in a reverse direction to retract the trays 62 from the cages 26 and rotate such trays to a substantially vertical position.

Thereafter the power plant 35 operates the gear reduction 37 to cause the sterilizing unit 34 to move through the alleyway between the side walls 23. As the sterilizing unit passes through the alleyway during the washing phase of operation, the nozzles 120 spray heated water and a cleaning agent under pressure from the pump 121 onto the trays 62 to remove any foreign material from the trays. At the end of the washing operation, clear rinse water from an external source is sprayed through the nozzles 120 during the rinsing phase of operation to rinse the trays 62 and leave them in an aseptic condition. After a desired length of time the entire process is repeated automatically.

It is noted that since an interval of approximately forty-five minutes exists between the time the trays are withdrawn from the cages and the time the trays are again refilled, the sterilizing unit could be programmed to make one or more traverses of the alleyway with the pump 121 operating to spray the trays 62 with the washing solution and one or more traverses while spraying clear rinse water. This will make certain that the trays are substantially sterile when they are reintroduced into the cages.

I claim:

1. Apparatus for treating neonatal animals comprising a plurality of individual cages, a selectively movable feeding tray for each of said cages, a diet dispensing unit normally located at one end of said cages and adapted to move past the cages, said diet dispensing unit including means for dispensing food into each of said trays, means for individually adjusting the amount of food dispensed into each tray, means for moving said trays into said cages and retracting said trays after a predetermined length of time, a sterilizing unit normally located at the opposite end of said cages from said dispensing unit, and means carried by said sterilizing unit for washing and rinsing said trays.

2. The structure of claim 1 including temperature modifying means associated with said dispensing unit for maintaining the food at a predetermined temperature.

3. The structure of claim 1 including a drain pan located below said dispensing unit, said drain pan having a solution of water and cleaning agent therein, said sterilizing unit having at least one nozzle, pump means for removing liquid from said drain pan and forcing the same through said nozzle under pressure to wash said trays.

4. The structure of claim 3 including a temperature modifying unit located within said drain pan for maintaining the solution at a desired temperature.

5. The structure of claim 3 including means for rinsing said trays with clear water, and means for maintaining the solution within said drain pan at a desired concentration.

6. In an apparatus for treating neonatal animals, said apparatus having a plurality of rows of individual cages for the animals and a separate feeding tray for each cage: the improvement comprising an automatically operated food dispensing unit having means for dispensing food into each of said trays, means for individually controlling the amount of food dispensed into each tray, means for moving at least a portion of each of said trays into said cages and retracting said trays therefrom, and means for sterilizing said trays after the trays have been retracted from said cages.

7. The structure of claim 6 in which said food dispensing unit includes at least one reservoir, valve means connected to said reservoir in a position to dispense liquid food therefrom, and operating arm means connected to said valve means for opening and closing the same.

8. The structure of claim 7 in which said means for individually controlling the amount of food dispensed includes an adjustable inclined plane adjacent to each cage and adapted to operate said operating arm means.

9. The structure of claim 6 in which said sterilizing means includes a first header connected to a washing solution, at least one nozzle carried by said header, means for pumping washing solution under pressure through said nozzle onto said trays, a second header connected to a source of clear rinse water, at least one nozzle carried by said second header, and means for forcing clear rinse water under pressure through said second nozzle and onto said trays to rinse the washing solution therefrom.

10. The structure of claim 6 in which said means for controlling the amount of food being dispensed includes means for selectively controlling the amount in accordance with the weight of the animal.

* * * * *